(12) United States Patent
Upadhyay et al.

(10) Patent No.: US 12,468,920 B2
(45) Date of Patent: Nov. 11, 2025

(54) FEEDBACK DRIVEN DECISION SUPPORT IN PARTIALLY OBSERVABLE SETTINGS

(71) Applicant: International Business Machines Corporation, Armonk, NY (US)

(72) Inventors: Sohini Upadhyay, Cambridge, MA (US); Yasaman Khazaeni, Needham, MA (US); Djallel Bouneffouf, Wappinger Falls, NY (US); Mayank Agarwal, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 827 days.

(21) Appl. No.: 16/524,291

(22) Filed: Jul. 29, 2019

(65) Prior Publication Data
US 2021/0034926 A1 Feb. 4, 2021

(51) Int. Cl.
  *G06N 3/006* (2023.01)
  *G06N 5/043* (2023.01)
  *G06N 7/00* (2023.01)
(52) U.S. Cl.
  CPC .............. *G06N 3/006* (2013.01); *G06N 5/043* (2013.01); *G06N 7/00* (2013.01)
(58) Field of Classification Search
  CPC .......... G06N 5/043; G06N 7/00; G06N 3/006; G06N 20/00; G06N 7/005; G06K 9/6263; G06K 9/6257
  USPC ........................................................ 706/45
  See application file for complete search history.

(56) References Cited

U.S. PATENT DOCUMENTS

| | | | |
|---|---|---|---|
| 7,318,051 B2 | 1/2008 | Weston | |
| 9,679,258 B2 | 6/2017 | Mnih | |
| 2012/0016642 A1* | 1/2012 | Li | G06Q 30/02 703/2 |
| 2018/0349514 A1 | 12/2018 | Alzate Perez et al. | |
| 2019/0065948 A1 | 2/2019 | Henry | |
| 2019/0073363 A1* | 3/2019 | Perez | G06F 16/335 |

(Continued)

FOREIGN PATENT DOCUMENTS

| | | |
|---|---|---|
| CN | 109978012 A | 7/2019 |
| CN | 112308234 A | 2/2021 |

OTHER PUBLICATIONS

Djallel Bouneffouf et al., "Context Attentive Bandits: Contextual Bandit with Restricted Context" Proceedings of the Twenty-Sixth International Joint Conference on Artificial Intelligence, Abstract; p. 1; 2017.*

(Continued)

*Primary Examiner* — Igor N Borissov
(74) *Attorney, Agent, or Firm* — Caleb D. Wilkes

(57) ABSTRACT

A novel formulation called the Context-Attentive Bandit with Observations (CABO) is described, where only a limited number of features can be accessed by the learner. The present invention is applicable to many problems including problems arising in clinical settings and dialog systems where it is not possible to reveal the whole feature set. The present invention adapts the standard contextual bandit algorithm known as Thompson Sampling with a novel algorithm, we call Context-Attentive Thompson Sampling with Observations (CATSO). Experimental results are included to demonstrate its effectiveness including a regret analysis and an empirical evaluation demonstrating advantages of the disclosed novel approach on several real-life datasets.

20 Claims, 6 Drawing Sheets

(56) References Cited

U.S. PATENT DOCUMENTS

2019/0122146 A1    4/2019   Meadows et al.
2019/0138693 A1    5/2019   Muller et al.

OTHER PUBLICATIONS

Donald Hebb, "The Organization of Behavior"; McGill University; New York, John Wiley $& Sons; 1949, pp. 1-365.*

Dimitri P. Bertsekas, "Dynamic Programming and Optimal Control"; 3rd Edition, vol. II; Massachusetts Institute of Technology; Nov. 11, 2011. pp. 320-552.*

Djallel Bouneffouf et al., "Context Attentive Bandits: Contextual Bandit with Restricted Context" Proceedings of the Twenty-Sixth International Joint Conference on Artificial Intelligence, pp. 1468-1475, 2017.

Peter Auer et al., "The Nonstochastic Multiarmed Bandit Problem" SIAM J. Comput. Vol. 32, No. 1, pp. 48-77 2002.

T. L. Lai et al., "Asymptotically Efficient Adaptive Allocation Rules", Advances in Applied Mathematics 6, 4-22 1985.

Peter Auer et al., "Finite-time Analysis of the Multiarmed Bandit Problem", Machine Learning, 47, 235-256 2002.

Niranjan Srinivas et al. "Gaussian Process Optimization in the Bandit Setting: No Regret and Experimental Design" Jun. 9, 2010 available at online URL https://arxiv.org/abs/0912.3995. pp. 1-17.

Lihong Li et al., "A Contextual-Bandit Approach to Personalized News Article Recommendation" Mar. 1, 2012 https://arxiv.org/pdf/1003.0146.pdf, pp. 1-10.

Young-Bum Kim et al. "A Scalable Neural Shortlisting-Reranking Approach for Large-Scale Domain Classification in Natural Language Understanding" Apr. 22, 2018, https://arxiv.org/pdf/1804.08064.pdf, pp. 1-9.

Yasin Abbasi-Yadkori et al. "Improved Algorithms for Linear Stochastic Bandits" 2019, https://proceedings.neurips.cc/paper/2011/file/e1d5be1c7f2f456670de3d53c7b54f4a-Paper.pdf, pp. 1-9.

Yasin Abbasi-Yadkori et al., "Online-to-Confidence-Set Conversions and Application to Sparse Stochastic Bandits" 2012, http://proceedings.mlr.press/v22/abbasi-yadkori12/abbasi-yadkori12.pdf, pp. 1-9.

Shipra Agrawal et al., "Thompson Sampling for Contextual Bandits with Linear Payoffs" Proceedings of the 30 th International Conference on Machine Learning, Atlanta, Georgia, USA 2013 http://proceedings.mlr.press/v28/agrawal13.pdf, pp. 1-9.

Ioannis Papaioannou et al., "Alana: Social Dialogue using an Ensemble Model and a Ranker trained on User Feedback" 1st Proceedings of Alexa Prize 2017 https://assets.amazon.science/aa/72/7234adc844af99a3c57b0967b90f/social-dialogue-using-an-ensemble-model-and-a-ranker-trained-on-user-feedback.pdf, pp. 1-9.

John Langford et al., "The Epoch-Greedy Algorithm for Contextual Multi-armed Bandits" 2019 http://www.tongzhang-ml.org/papers/nips07-bandits.pdf, pp. 1-8.

Alexandra Carpentier et al., "Bandit Theory meets Compressed Sensing for high-dimensional Stochastic Linear Bandit", Proceedings of the 15th International Conference on Artificial Intelligence and Statistics 2012, http://proceedings.mlr.press/v22/carpentier12/carpentier12.pdf, pp. 1-9.

Wei Chu et al., "Contextual Bandits with Linear Payo Functions", Proceedings of the 14th International Conference on Artifcial Intelligence and Statistics 2011, http://proceedings.mlr.press/v15/chu11a/chu11a.pdf, pp. 1-7.

J. C. Gittins, "Bandit Processes and Dynamic Allocation Indices", Journal of the Royal Statistical Society. Series B (Methodological), vol. 41, No. 2 1979, https://core.ac.uk/download/pdf/6519269.pdf, pp. 1-31.

Jeffrey Pennington et al., "GloVe: Global Vectors for Word Representation" 2019, https://aclanthology.org/D14-1162.pdf, pp. 1-12.

Tamsa Bastani et al, "Online Decision-Making with High-Dimensional Covariates" 2019, https://hamsabastani.github.io/lassobandit.pdf, pp. 1-58.

Oluwatosin Adewale et al., "Pixie: A Social Chatbot", 1st Proceedings of Alexa Prize 2017, https://assets.amazon.science/a4/8d/ad9e99a744ef9ae4f91fe0a25504/a-social-chatbot.pdf, pp. 1-10.

Adam Bress et al., "Revisiting Warfarin Dosing Using Machine Learning Techniques", Computational and Mathematical Methods in Medicine Jul. 2015, https://www.hindawi.com/journals/cmmm/2015/560108/, pp. 1-11.

Lijing Qin et al., "Contextual Combinatorial Bandit and its Application on Diversifed Online Recommendation" 2014, https://epubs.siam.org/doi/pdf/10.1137/1.9781611973440.53, pp. 1-9.

Chinese Notification of the First Office Action, Chinese Application No. 202010737487.7, Dated Jan. 10, 2024, 16 pages.

Hachiya et al., "Feature Selection for Reinforcement Learning: Evaluating Implicit State-Reward Dependency via Conditional Mutual Information," ECML PKDD'10: Proceedings of the 2010 European conference on Machine learning and knowledge discovery in databases: Part I, Sep. 2010, pp. 474-489.

Kroon et al., "Automatic Feature Selection for Model-Based Reinforcement Learning in Factored MDPs," 2009 International Conference on Machine Learning and Applications, Dec. 13-15, 2009, https://ieeexplore.ieee.org/document/5381529, pp. 324-330.

Nguyen et al., "Online Feature Selection for Model-based Reinforcement Learning," Proceedings of the 30th International Conference on Machine Learning, Jun. 2013, https://proceedings.mlr.press/v28/nguyen13.pdf, pp. 1-9.

Grace Period Disclosure: Upadhyay et al., "A Bandit Approach to Posterior Dialog Orchestration Under a Budget", arXiv:1906.09384v1 [cs.AI] Jun. 22, 2019, pp. 1-10.

The Second Office Action, Chinese Application No. 202010737487.7, Dated May 30, 2024, 9 pages (pp. 1-5 English Translation, pp. 6-9 Original Office Action).

The State Intellectual Property Office of People's Republic of China, The Second Office Action, May 30, 2024, 9 pages (pp. 1-5 English translation, pp. 6-9 original Chinese-language Office Action), Chinese Application No. 202010737487.7.

The State Intellectual Property Office of People's Republic of China, Notification to Grant, Jun. 24, 2024, 4 pages (pp. 1-2 English translation, pp. 3-4 original Chinese-language Notification to Grant), Chinese Application No. 202010737487.7.

* cited by examiner

Table 2: Stationary setting

| | Warfarin | | | | | |
|---|---|---|---|---|---|---|
| % Context Revealed | 10 | 20 | 40 | 60 | 80 | 100 |
| TSRC | 50.11 ± 1.36 | 53.28 ± 1.08 | 57.60 ± 1.16 | 59.87 ± 0.69 | 61.31 ± 0.60 | 63.92 ± 0.23 |
| CATSO | 50.11 ± 1.36 | 53.65 ± 1.21 | 58.55 ± 0.67 | 60.40 ± 0.74 | 61.58 ± 0.47 | 63.92 ± 0.23 |
| | Covertype | | | | | |
| % Context Revealed | 10 | 20 | 40 | 60 | 80 | 100 |
| TSRC | 53.51 ± 0.14 | 54.64 ± 1.87 | 63.35 ± 1.87 | 69.59 ± 1.72 | 75.58 ± 1.34 | 85.65 ± 0.13 |
| CATSO | 53.51 ± 0.14 | 65.57 ± 2.17 | 72.58 ± 2.36 | 78.58 ± 2.35 | 84.60 ± 2.37 | 85.65 ± 0.13 |
| | CNAE-9 | | | | | |
| % Context Revealed | 10 | 20 | 40 | 60 | 80 | 100 |
| TSRC | 28.42 ± 1.99 | 33.57 ± 2.43 | 38.62 ± 1.68 | 42.05 ± 2.14 | 41.84 ± 1.96 | 43.17 ± 2.50 |
| CATSO | 28.42 ± 1.99 | 29.84 ± 1.82 | 39.10 ± 1.41 | 40.52 ± 1.42 | 40.86 ± 2.33 | 43.17 ± 2.50 |

FIG. 4

Table 3: Nonstationary setting

| | Warfarin | | | | | |
|---|---|---|---|---|---|---|
| % Context Revealed | 10 | 20 | 40 | 60 | 80 | 100 |
| WTSRC | 54.76 ± 0.47 | 55.83 ± 0.55 | 58.00 ± 0.83 | 59.85 ± 0.60 | 61.01 ± 0.78 | 62.79 ± 0.37 |
| NCATSO | 54.76 ± 0.47 | 59.47 ± 2.89 | 59.34 ± 2.04 | 63.26 ± 0.75 | 63.31 ± 0.53 | 62.79 ± 0.37 |
| | Covertype | | | | | |
| % Context Revealed | 10 | 20 | 40 | 60 | 80 | 100 |
| WTSRC | 44.13 ± 0.69 | 50.26 ± 1.58 | 58.99 ± 1.81 | 64.91 ± 1.38 | 71.62 ± 2.23 | 79.14 ± 1.15 |
| NCATSO | 44.13 ± 0.69 | 48.50 ± 1.05 | 68.17 ± 3.14 | 83.78 ± 5.51 | 87.33 ± 1.58 | 79.14 ± 1.15 |
| | CNAE-9 | | | | | |
| % Context Revealed | 10 | 20 | 40 | 60 | 80 | 100 |
| WTSRC | 14.35 ± 0.44 | 19.91 ± 2.67 | 30.86 ± 2.92 | 36.01 ± 2.88 | 37.53 ± 2.15 | 40.36 ± 1.79 |
| NCATSO | 14.35 ± 0.44 | 30.88 ± 0.96 | 34.91 ± 1.93 | 42.04 ± 1.52 | 42.11 ± 1.09 | 40.36 ± 1.79 |

FIG. 5

FEEDBACK DRIVEN DECISION SUPPORT IN PARTIALLY OBSERVABLE SETTINGS

STATEMENT REGARDING PRIOR DISCLOSURE BY THE INVENTORS

The following disclosure is submitted under 35 U.S.C. 102(b)(1)(A): DISCLOSURE: UPADHYAY et al., "A Bandit Approach to Posterior Dialog Orchestration Under a Budget", arXiv:1906.09384v1 [cs.AI] 22 Jun. 2019, pages 1-10.

BACKGROUND

The present application generally relates to an improved data processing apparatus and method and, more specifically to machine learning systems using reinforcement learning.

The contextual bandit problem is a variant of the extensively studied multi-armed bandit problem, where at each iteration, before choosing an arm, the agent observes an N-dimensional context, or feature vector, and uses it to predict the next best arm to play. The agent uses this context, along with the rewards of the arms played in the past, to choose which arm to play in the current iteration. Over time, the agent's aim is to collect enough information about the relationship between the context vectors and rewards, so that it can predict the next best arm to play by looking at the corresponding context.

SUMMARY

The present invention is a novel formulation called the Context-Attentive Bandit with Observations (CABO), where only a limited number of features can be accessed by the learner. The present invention is applicable to many problems including problems arising in clinical settings and dialog systems where it is not possible to reveal the whole feature set. The present invention adapts the standard contextual bandit algorithm known as Thompson Sampling with a novel algorithm, we call Context-Attentive Thompson Sampling with Observations (CATSO). Experimental results are included to demonstrate its effectiveness, including a regret analysis and an empirical evaluation demonstrating the advantages of the disclosed novel approach on several real-life datasets. This application references several teachings from non-patent literature listed in the information disclosure statement filed herewith. The teachings of each of the non-patent literature is hereby incorporated hereinto by reference in their entirety The present invention discloses a feedback-driven methodology that can exploit a small fixed subset of known features to choose additional unknown features that together best inform a decision process. The present invention includes the feature of utilizing observable feature values and feature budget size to decide which initially unobservable features are revealed using a reinforcement learning (RL) policy, and utilizing all observed features to make a decision using an RL policy and updating the RL policies with feedback on the suggested action/decision.

More specifically, the present invention is a system, computer program product, and method for making decisions using limited features in a reinforcement learning system. The method begins with obtaining initially observable feature values corresponding to a list of initially observable features, a list of initially unobservable features, and a maximum number of observable features relating to a computer system being interacted with by a reinforcement learning agent. The initially observable feature values are one or more of numeric feature values, structural feature values, string values, and graph values. In one example, the initially observable features represent patient history and the initially unobservable features are available patient tests. In another example, the initially observable features are one or more of speech dialog utterances and user history and the initially unobservable features are available responses. In yet another example, the initially observable features are one or more of user information history and the initially unobservable features are available responses The reinforcement learning agent selects actions from a set of actions to cause the computer system to move from one state to another state, whereby the selections of the actions are modeled as a reinforcement learning policy. The selected actions are next performed to cause the computer system to move from one state to another state. The initially observable feature values and the maximum number of observable features are used to select which initially unobservable features to reveal using a first reinforcement learning policy for feature selection. Next, the initially observable features along with the initially unobservable features are used, which have been revealed, to select the next action from the set of actions using a second reinforcement learning policy for decision selection. The first reinforcement learning policy and the second reinforcement learning policy are updated with feedback based on the next action which has been selected. The above steps are repeated over a settable number of iterations. These steps in one example are applied to the contextual bandit algorithm but in other examples, other algorithms are contemplated.

The present invention, in another example, is applied to single or multi-stage examples. In the case of stationary data, the claimed invention further provides obtaining a total number of features and a total number of desired features to observe over a settable number of stages. The steps above include another step of selecting a subset of features using a contextual combinatorial bandit approach followed by a contextual bandit approach. This additional step can be repeated for more than one iteration or a settable number of iterations.

In the case of nonstationary data, the claimed invention further provides obtaining a total number of features and a total number of desired features to observe over a settable number of stages. The steps above include another two steps of selecting a subset of features using a contextual combinatorial bandit approach followed by a contextual bandit approach and updating at least one of the first reinforcement learning policy and the second reinforcement learning policy using a decay parameter computed by a GP-UCB algorithm. Like the stationary case, these additional steps can be repeated for more than one iteration or a settable number of iterations.

BRIEF DESCRIPTION THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 is a table of experimental results using the CATSO approach with stationary dataset;

FIG. 5 is a table of experimental results using the CATSO approach with nonstationary dataset;

DETAILED DESCRIPTION

Figure 1:
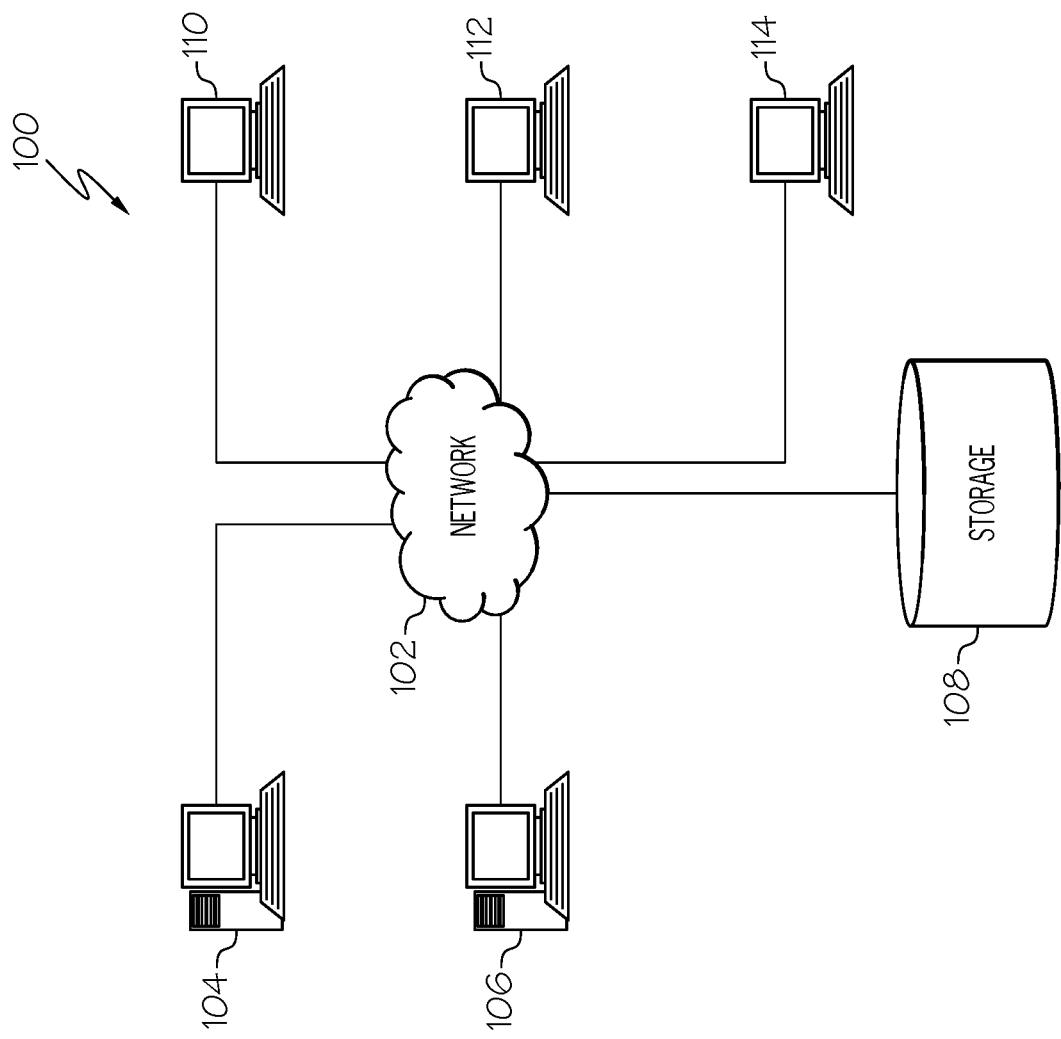
FIG. 1 is an example diagram of a distributed data processing system in which aspects of the invention may be implemented.

Context-attentive bandits are contextual bandits that predict which arm to play based on partially observable contexts. A challenge with context-attentive bandits is that observing the full context is impossible and the agent is allowed to observe just a small subset of information at the onset. For instance, in clinical settings, a doctor conducts a first stage exploration of patient information during a medical examination, uses this information to explore more features with medical tests, and then decides on a treatment plan. In this clinical setting a small subset of features are observed during an exam and the results of all possible tests are unobserved. The true label or best possible treatment plan can never be known, only the reward or feedback on the treatment plan chosen. Conducting all possible tests is, at very least impractical and costly, if not altogether impossible, necessitating an intelligent selection of unobserved context features to maximize reward. Notice that when there are greater than two treatment plans or potential responses, the ground truth is unavailable. The doctor can never know the "best treatment" or "best response," only the patient or user's feedback on the action chosen.

Similar problems can arise in multi-skill orchestration for Artificial Intelligence (AI) agents. In dialog orchestration, a user's query is often directed to a number of domain specific agents and the best response is returned. In this case, the query can be immediately observed, but the set of features or responses from the domain specific agents cannot. For multi-purpose dialog systems, like personal home assistants, retrieving features or responses from every domain specific agent is computationally expensive or intractable, with the potential to cause a poor user experience, again underscoring the need for effective feature selection. Using the query to shortlist potential responses is necessary.

Determining how to exploit a small fixed subset of known features to choose additional unknown features that together best inform a decision process is common problem. A challenge is to automate this decision process when the ground truth is unavailable.

Context-attentive bandits are contextual bandits that predict which arm to play based on partially observable contexts. Disclosed is a special case of the context attentive bandit, called the Context-Attentive Bandit with Observations (CABO), where observing the full context vector at each iteration is impossible, but a small subset of context features is observable and a fixed number of the unobserved features can be revealed. The number of unknown context features that can be revealed is fixed for all iterations and the agent can explore any subset of the unobserved context of this given size. The goal in this problem is to select the best feature subset at each iteration in order to maximize overall reward, which in this setting involves exploring both the feature space as well as the arms space.

Disclosed is a new variant of the context-attentive bandit problem, CABO, motivated by practical applications with limited information access. Also disclosed are two new algorithms, both for stationary and nonstationary settings of the CABO problem, and empirical evaluation demonstrating the advantages of our proposed methods over a range of datasets and parameter settings.

Data Processing Environment

Figure 2:
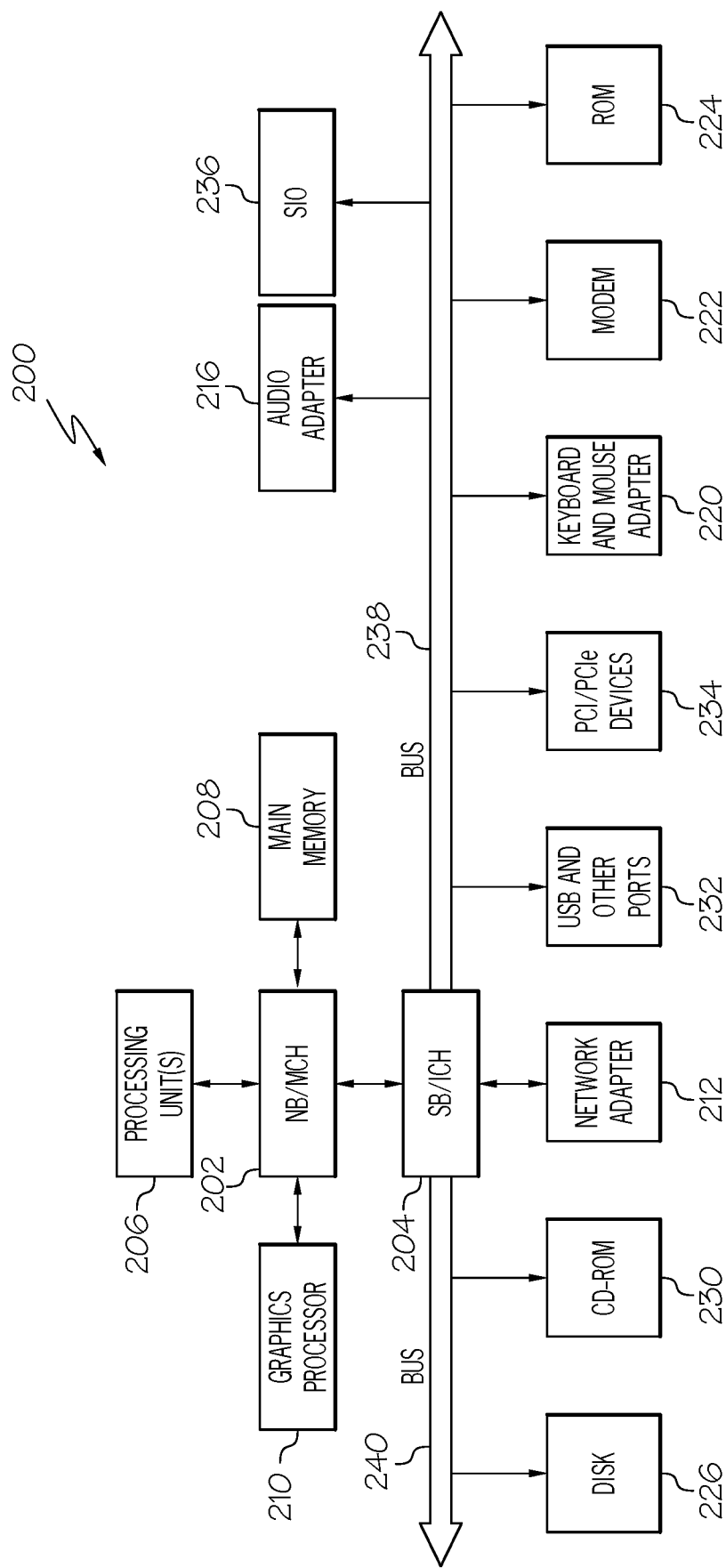
FIG. 2 is an example block diagram of a computing device in which aspects of the invention may be implemented.

Thus, the illustrative embodiments may be utilized in many different types of data processing environments. In order to provide a context for the description of the specific elements and functionality of the illustrative embodiments, FIG. 1 and FIG. 2 are provided hereafter as example environments in which aspects of the illustrative embodiments may be implemented. It should be appreciated that FIG. 1 and FIG. 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer-usable code or instructions implementing the processes for illustrative embodiments of the present invention may be located.

In the depicted example, data processing system 200 employs a hub architecture including north bridge and memory controller hub (NB/MCH) 202 and a south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor-based computer system, or the like, running the Advanced Interactive Executive (AIX®) operating system or the LINUX® operating system. Data processing system 200 may be a symmetric multiprocessor (SMP) system, including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIG. 1 and FIG. 2 may vary depending on the implementation. Other internal hardware or peripheral devices, such as flash memory, equivalent non-volatile memory, or optical disk drives and the like, may be used in addition to or in place of the hardware depicted in FIG. 1 and FIG. 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

BACKGROUND

This section introduces some background concepts in which the present invention builds upon, such as contextual bandit and contextual combinatorial bandit.

The contextual bandit problem. Following, this problem is defined as follows. At each time point (iteration), $t \in \{1, \ldots T\}$ an agent is presented with a context (feature vector) $c(t) \in R^N$ before choosing an arm $k \in A = \{1, \ldots K\}$. We will denote by $C = \{C_1, \ldots C_N\}$ as the set of features (variables) defining the context. Let $r(t) = \{r1(t), \ldots rk(t)\}$ denote a reward vector, where $r_k(t) \in [0,1]$ is a reward at time t associated with the arm $k \in A$. Herein, we will primarily focus on the Bernoulli bandit with binary reward, i.e. $r_k(t) \in [0,1]$. Let $\pi: R^N \to A$ denote a policy, mapping a context $c(t) \in R^N$ into an action $k \in A$. We assume some probability distribution $P_c(c)$ over the contexts in C, and a distribution of the reward, given the context and the action taken in that context. We will assume that the expected reward (with respect to the distribution $P_r(r|c,k)$) is a linear function of the context, $$\text{i.e. } E[r_k(t) | c(t)] = u_K^T c(t),$$

where $u_k$ is an unknown weight vector associated with the arm k; the agent's objective is to learn $u_k$ from the data so it can optimize its cumulative reward over time.

Contextual Combinatorial Bandit (CCB)

The feature subset selection approach in this invention builds upon the Contextual Combinatorial Bandit (CCB) problem, specified as follows. Each arm $k \in A = \{1, \ldots K\}$ is associated with the corresponding variable $x_k(t) \in R$, which indicates the reward obtained when choosing the k-th arm at time t, for t>1. Let us consider a constrained set of arm subsets $S \subseteq P(K)$, where $P(K)$ is the power set of K, associated with a set of variables $\{r_M(t)\}$, for all $M \in S$ and t>1. Variable $r_M(t) \in R$ indicates the reward associated with selecting a subset of arms M at time t, where $r_M(t) = h(x_k(t),$ k∈M, k∈M, for some function h( ). The contextual combinatorial bandit setting can be viewed as a game where the agent sequentially observes a context c, selects subsets in S and observes rewards corresponding to the selected subsets. Here we will define the reward function h( ) used to compute $r_M(t)$ as a sum of the outcomes of the arms in M, i.e. $r_M(t) = \Sigma_{k \in M} x_k(t)$, although one can also use nonlinear rewards. The objective of the CCB algorithm is to maximize the reward over time. We consider here a stochastic model, where the expectation of $x_i(t)$ observed for an arm k is a linear function of the context, i.e. $E[x_i(t) | c(t)] = u_i^T c(t)$, where $u_i$ is an unknown weight vector (to be learned from the data) associated with the arm i. The outcomes distribution can be different for each arm. The global rewards $r_M(t)$ are also random variables independent and distributed according to some unknown distribution with some expectation $u^M$.

Problem Setting: Context-Attentive Bandit with Observations (CABO)

In this section, we introduce a novel type of contextual bandit problem, called Context-Attentive Bandit with Observations (CABO), present an algorithm for solving these problems, and derive theoretical results (regret bounds) for the algorithm.

As mentioned above, $c(t) \in R^N$ will denote a vector of values assigned to an (ordered) set of random context variables, or features, $C = \{C_1, \ldots C_N\}$, at time t. Let $C^X \subseteq C$, $|C^X| \leq X$, $0 < X \leq N$, denote a subset of features of size X. Let $c^X(t) \in S_c x$ be a vector where $S_c x \subseteq R^N$, which is defined as a subspace $R^N$ containing all sparse vectors with features vectors where the only nonzero features appear within $C^X$.

We will now introduce the following problem setting, outlined in Algorithm 1. We assume that at each time point t the environment generates a feature vector $c(t) \in R^N$ which the agent cannot observe fully. However, unlike CBRC setting, the proposed setting provides a partial observation of the context, i.e., reveals the values Cy a subset of observed features $C^V \subset C$, V<N. Based on this partially observed context, observations, the agent is allowed to request U additional unobserved features. The goal of the agent is to maximize its total reward over time via (1) the optimal choice of the additional observations, given the initial ones, and (2) the optimal choice of an action k∈A. A based on both observations.

---

Algorithm 1 CABO Problem Setting

---

1: for t = 1 to T do
2:     Context c(t) is drawn from distribution $P_c(c)$
3:     The values $c^V(t)$ of a subset $C^V \in C$ are observed
4:     The agent selects a subset $C^U = h(c^V(t))$, $C^U \subseteq C$
5:     The values $c^U(t)$ are revealed; $c^{V+U}(t)$ will denote the observed values of features of features in $c^D$ are revealed, $C^V \cup C^U$

---

Algorithm 1 CABO Problem Setting

---

6:     The agent chooses an arm $k(t) = \hat{\pi}(c^{V+U}(t))$
7:     The reward $r_k(t)$ is revealed
8:     The agent updates the policy $\pi \in \Pi$
9:     t = t + 1
10: end for

---

We will consider a set Π of all compound-function policies, which first choose a feature subset $C^U(t)$ given the observation $c^V(t)$, obtain $c^{U+V}(t)$, and then map the feature subset values to actions:

$$\Pi = \cup_{c^U \in S} \{\pi : \subseteq R^N \to A | \pi(c) = \hat{\pi}t(c^{U+V})\}. \quad \text{Eq 1:}$$

where $S = \{C^U | C^U \subseteq C | C^V\}, |C^U| = U\}$ is a set of all possible subsets of additional U features the agent may request to observe, given the partial context $c^V$, and where $\pi : S_{c^{V+U}} \to A$ is a function mapping the final observed feature vector $c^{V+U} \in S_{c^{V+U}}$ into an action (a.k.a. bandit's arm) $k(t) \in A$, which results into a reward $r_k(t)$.

The objective of a contextual bandit algorithm is to find an optimal policy $\pi \in \Pi$, over T iterations or time points, so that the total reward is maximized. Assuming a stochastic setting, where both contexts and rewards are random variables drawn from the probability distribution $P_C(c)$ and $P_r(c,k)$, respectively, we can formally define our novel problem setting as follows:

Definition 1 (Cumulative regret). Let Π be a set of policies in eq. 1. Then the cumulative regret over T iterations of an algorithm solving the CABO problem, i.e. optimizing its policy $\pi \in \Pi$, is defined as $$R(T) = \max_{\pi \in \Pi} \Sigma_{t=1}^T r_{\pi c(t)}(t) - \Sigma_{t=1}^T r_{k(t)}(t). \quad \text{Eq 2:}$$

The objective of a contextual bandit algorithm, which learns the hypothesis $\pi \in \Pi$ over T iterations, is to minimize the cumulative regret R(T).

Before introducing an algorithm for solving the above CABO problem, we will derive a lower bound on the expected regret of any algorithm used to solve this problem.

Theorem 1. For any policy $\pi \in \Pi$ computed by a particular algorithm for solving CABO problem, given the initial feature subset $C^V$ with V<N, $N^2 \leq T$ and $T \geq (_V^{N-V})$, there exists probability distribution $P_C(c)$ and $P_r(c,k)$, such that the lower bound of the expected regret accumulated by the algorithm over T iterations is:

$$\Omega(\sqrt{T(U+V)} + \sqrt{TV}.$$

The first term comes from the lower bound of the linear bandit with the (U+V) best components, and the second one from the lower bound of the linear bandit with the V best components. The condition on N and T comes from Lemma 7. Proof details can be found in the supplemental material. See online URL<<http://tinyurl.com/y3719chm>> the teachings of which is hereby incorporated by reference in its entirety. Note that this lower bound is worse than the classical contextual bandit since the algorithm needs to explore both the features space and the arms space.

New Method: Context-Attentive Thompson Sampling with Observations (CATSO)

note that this assumption is different from the linear reward assumption where a single parameter u was considered for

---

Algorithm Context-Attentive Thompson Sampling with Observations 2

1. Require: Total number of features N; initially observed number of features V ; the set of those features CV ; the number of additional features to observe U; the distribution parameter $\alpha$, and the function $\lambda(t)$ computed differently for stationary and nonstationary cases.
2. Initialize: $\forall k \in \{1, \ldots T\}$, $A_k = I_K$, $g_k = 0_K$, $\hat{u}_k = 0_K$, and $\forall i \in \{1, \ldots N\}$, $B_i = I_N$, $z_i = 0_N$, $\hat{\Theta}_I = 0_N$,
3. Foreach $t \in 1, 2, \ldots, T$ do
4.    observe $c^V(t)$, given feature subset $C^V$
5.    Foreach context feature $i = 1, \ldots, N$ do
6.      if $i$ NOT IN $C^V$ then
7.        Sample $\theta_i$, from $N(\hat{\Theta}_I, \alpha^2, B_i^{-1})$
8.      End if
9.    End do
10.   Select $C^u = \arg\max_{C \subseteq C/C^V, |C|=U} \Sigma_{i \in C} c(t)^T \theta_i$
11.   $C^{U+V}(t) = C^V \cup C^u(t)$
12.   observe values $c^{U+V}(t)x(t)$ of features in $C^{U+V}(t)$
13.   $c(t) = c^{U+V}(t)^V$
14.   Foreach arm $k = 1; \ldots; K$ do
15.    Sample $u_k$ from $N(\hat{\Theta}_k, \alpha^2, A_k^{-1})$ distribution.
16.   End do
17.   Select $k(t) = \arg\max_{k \in \{1,k\}} c^T u_k$
18.   Observe $r_k(t)$
19.   $A_k(t) = A_k(t) + c(t)c(t)^T$
20.   $g_k = g_k + c(t)r_k(t)$
21.   $\hat{\Theta}_k = A_k^{-1} g_k$
22.   Foreach $i \in C^U$
23.    $B_i = \lambda(t)B_i + c(t)cx(t)^T$
24.    $z_i = z_i + c^T(t)r_k(t)$
25.    $\hat{\Theta}_I = \lambda(t)B_i^{-1}z_i$
26.   End do
27. End do

---

We now propose a method for solving the CABO problem, called Context-Attentive Thompson Sampling with Observations (CATSO), and summarize it in Algorithm 2 (see section 3 for background on Thompson Sampling). The combinatorial task of selecting the best subset of features is treated as a contextual combinatorial bandit (CCB) problem, and the subsequent decision-making (action selection) task as a contextual bandit problem solved by Thompson Sampling, respectively.

The algorithm takes the total number of features N, initially observed number of features V, and the number of additional features to observe, U, as its inputs. We also provide as an input the distribution parameter used in Contextual Thompson Sampling (CTS).

We iterate over T steps, at each iteration t first observing values $c^V(t)$ of features in the originally observed subset $C^V$. At each iteration t, we sample the vector parameter $\theta_i \in R^V$ (step 7) from the corresponding multivariate Gaussian distribution, separately for each feature i not yet observed so far, to estimate $\hat{\Theta}_I$. At each stage, we select the best subset of features, $C^U \subseteq C/C^V$, such that $C^u = \arg\max_{C' \subseteq C/C^V, |C'|=U} \Sigma_{i \in C'} c^T$.

Once a subset of features is selected using the contextual combinatorial bandit approach, we switch to the contextual bandit setting in steps 17-26, to choose an arm based on the context consisting now of a subset of features.

We will assume that the expected reward is a linear function of a restricted context, $$E[r_k(t) | c(t)] = u\frac{T}{k}c(t);$$

all arms, there was no restricted context, and for each arm, a separate context vector $c_k(t)$ was assumed.

Besides this difference, we will follow the approach for the Contextual Thompson Sampling (CTS). We assume that reward $r_k(t)$ for choosing arm k at time t follows a parametric likelihood function $P(r(t)|u_k)$, and that the posterior distribution at time t+1, $P(u|r(t)) \alpha P(r(t)|u) P(u)$, is given by a multivariate Gaussian distribution $N(\widehat{u_k}(t+1), \alpha^2 A_k(t+1)^{-1})$, where $A_k(t) = I_N + \Sigma_{r=1}^{t-1} c(r)c(r)^T$ with N the size of the context vectors c, $$\alpha = R\sqrt{\frac{24}{\epsilon}} d\ln\left(\frac{1}{\gamma}\right) \text{ with } R > 0,$$

$\epsilon \in [0,1], \gamma \in [0,1]$ constants, and $\hat{u} = A(t)^{-1} = (\Sigma_{r=1}^{t-1} c(r)c(r)^T)$.

At each time point t, and for each arm, we sample a k-dimensional $u_k$ from $N(\widehat{u_k}(t+1), \alpha^2 A_k(t+1)^{-1})$, choose an arm maximizing $c(t)^T u_k$ (step 17 in the algorithm), obtain the reward $r_k(t)$ for choosing an arm k, and finally update the relevant parameters.

We now derive an upper bound on the regret of the policy computed by the CATSO algorithm we just presented. However, to make the analysis more convenient. We assume that the algorithm has to choose between an independent subset of features $C^V$. This makes the algorithm solving a contextual bandit problem at the features level rather than a combinatorial contextual bandit problem. We start with a useful definition:

Definition 2 (Optimal Policy for CABO). The optimal policy for solving the CABO is selecting the arm at time $t: k(t) = \arg\max_{K \in K, C^V \in C} u_k^*(t)^T c^{*, U+V}(t) + \theta_c^* v(t)^T c^V(t)$ where $u_k^*$ is the optimal coefficient vector for the arm k, and $\theta_c^* v(t)$ the optimal coefficient vector for the feature $C^V$, and where $C^{*,U+V}(t)$ denotes the optimal feature set of size U+V, and $c^{*,U+V}(t)$ denotes the observation of the optimal feature set.

We also need the following assumption: $\forall C^{,U+V} \in C$ with $p(C^{U+V}) > 0$, positive function, such that the noise $n_{k,t} = r_k(t) - c^{U+V}(t)^T \widehat{u}_k$ is conditionally $p(U+V)$-subgaussian, that is for all $t \geq 1$ and $p(U+V) \in R$, $$\forall \lambda \epsilon R, E\left[e^{\lambda n_t}, \exp\left(\frac{\lambda^2 p(C^{U+V})^2}{2}\right)\right]. \quad \text{Eq 3}$$

Note that this condition implies that the noise has zero mean and depends on $C^{U+V}$ where U is chosen at each iteration. So, this heteroscedastic noise is due to the fact that the reward observed at the feature subset selection step depends on the performance of the arm selection step. The later step creates time variance on the noise that the first algorithm is observing and vice versa.

Using the above definition of regret, we can now derive the following result.

Theorem 2. Assuming that the measurement noise $n_t$ satisfies assumption (3). With probability $1-\delta$, where $0<\delta<1>0$, with $p>0$, $\|c_t\| \leq 1$, $\|u^*\| \leq 1$, $\|\theta^*\| \leq 1$, the regret $R(T)$ accumulated by the CATSO algorithm in T iterations is upper-bounded by $$R(T) \leq$$

$$\left(p(U+V)\sqrt{T\log(K)} + \sqrt{T(N-V)\log(N-V)}\right)\left(\ln(T) + \sqrt{\ln(T)\ln\frac{1}{\delta}}\right)$$

where $= p = \operatorname{argmax}_{C^{U+V} \subset C} p(C^{U+V})$

Theorem 2 states that the regret of the proposed algorithm depends on the following two components: the error caused by using the best features vector (upper-bounded by the regret of the CTS) and the error caused by choosing a suboptimal features subset (upper-bounded by the regret of the CTS in the contextual bandit with heteroscedastic noise on rewards).

Experiments

Empirical evaluation of the proposed methodology was performed on three publicly available datasets, Covertype1, CNAE-91 and Warfarin. The details for each of these datasets are summarized in Table 1.

TABLE

Datasets

| Datasets | Instances | Features | Classes |
|---|---|---|---|
| Covertype1 | 500 000 | 95 | 7 |
| CNAE-91 | 1080 | 856 | 9 |
| Warfarin | 5228 | 93 | 3 |

We assess Context-Attentive Thompson Sampling with Observations (CATSO) with respect to the current state of the art for context-attentive bandits, Thompson Sampling with Restricted Context (TSRC). TSRC solves the contextual bandit with the restricted context problem (CBRC) discussed prior, which selects a set of unknown features at each event while assuming no observable features exist. For a total number of features N and total feature budget D, we refer to the O observed features as the known context and N−O unobserved context features as the unknown context.

In our use of the TSRC algorithm, at each iteration, the known context is observed, the TSRC decision mechanism independently chooses U=D−O unknown context features to reveal, and Contextual Thompson Sampling (CTS) is invoked.

For the stationary setting, we randomly fix 10% of the context feature space of each dataset to be known at the onset and explore a subset of U unknown features. Notice that when U=0, both of the approaches reduce to CTS with just the fixed known context, and when U is equivalent to 90% of N, the total number of context features, each of the approaches reduces to CTS with the full context. For CATSO we fix $\lambda(t)=1$ to reflect the stationary setting and choose S=1. For both CATSO and TSRC we fix v=0.25. We report the total average reward across a range of U corresponding to various percentages of N for each algorithm in Table 2 in FIG. 4. The results in Table 2 are promising, with CATSO outperforming the TSRC baseline in the majority of cases. CATSO sometimes outperforms and other times nearly matches TSRC performance on the CNAE-9 dataset. This outcome is somewhat expected, for in the original work on TSRC, the mean error rate of TSRC was only 0:03% lower than randomly fixing a subset of unknown features to reveal for each event on CNAE-9. This suggests that the operating premise of TSRC, that some features are more predictive of reward than others, does not hold on this dataset. On top of this assumption, CATSO also assumes that there exist relationships between the known and unknown context features, likely causing a small compounding of error. CATSO outperforms TSRC on both Warfarin and Covertype.

Figure 6:
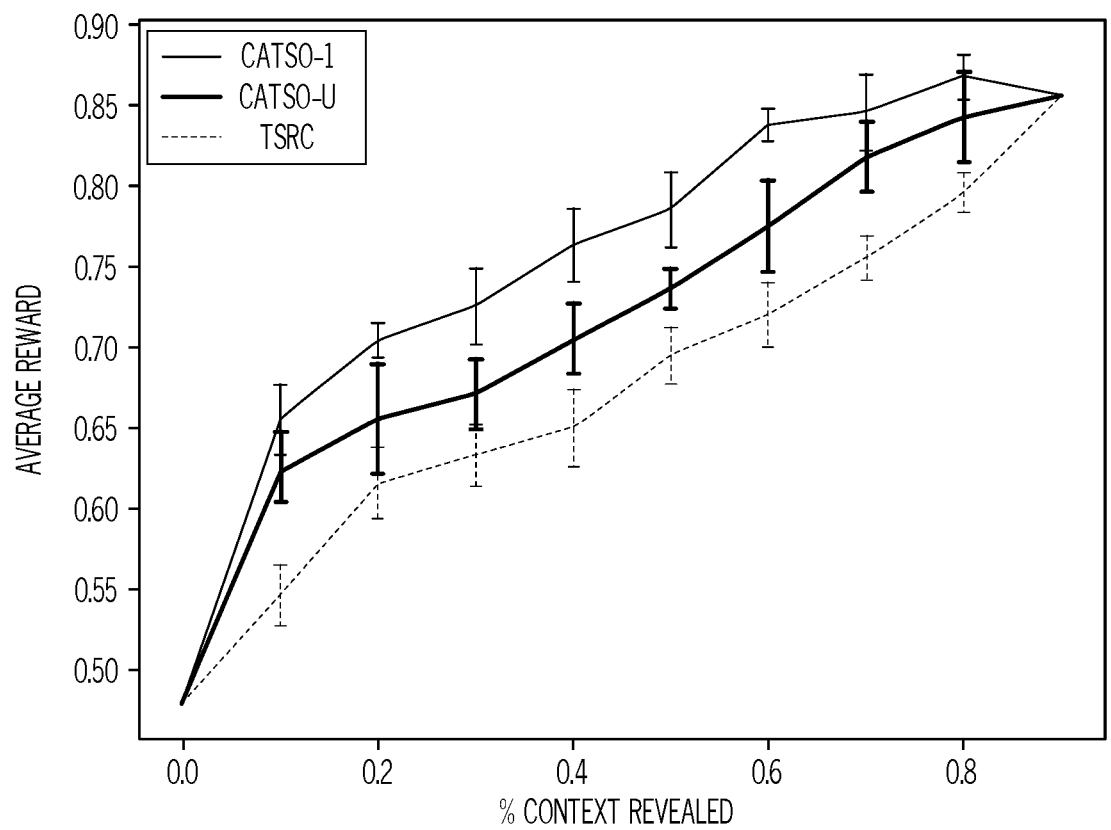
FIG. 6 is a graph of experimental results a comparison with Weighted TRSC (WTRSC) approach for a stationary Covertype dataset.
Figure 7:
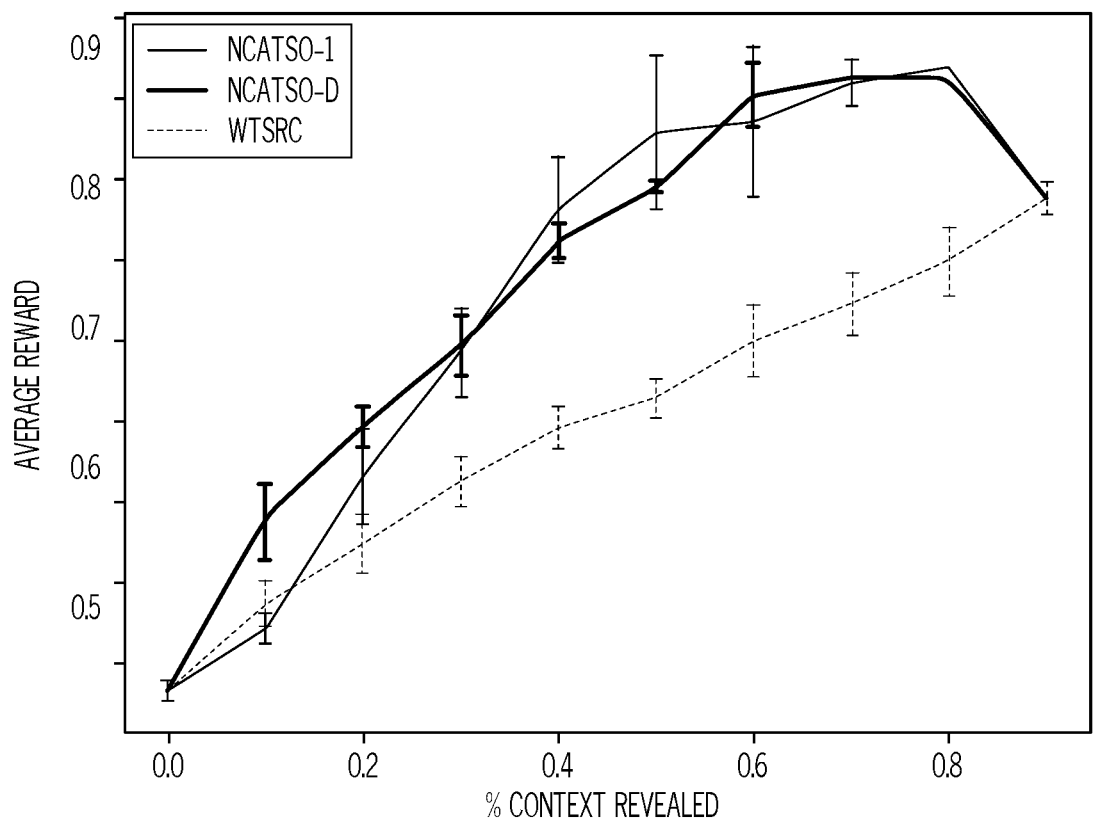
FIG. 7 is a graph of experimental results a comparison with WTRSC approach for a nonstationary Covertype dataset.

Next we examine the case where the unknown feature space is nonstationary. To simulate nonstationarity in the unknown feature space, we duplicate each dataset, randomly fix the known context in the same manner as above, and shuffle the unknown feature set-label pairs. Then we stochastically replace events in the original dataset with their shuffled counterparts, with the probability of replacement increasing uniformly with each additional event. For this nonstationary setting, which we refer to as NCATSO, we fix S=1 and use A(t) defined by the GP-UCB algorithm. We compare NCATSO to Weighted TSRC (WTSRC) where TSRC is Thompson Sampling with Restricted Context, the nonstationary version of TSRC also developed in the cited Bouneffouf et al. 2017 reference. WTSRC makes updates to its feature selection model based only on recent events, where recent events are defined by a time period, or "window" w. We choose w=100 for WTSRC, fix v=0:25 for both of the algorithms, randomly fix 10% of the context to be known, and contrast the approaches total average reward in Table 3 in FIG. 5. Here we observe that NCATSO again outperforms the state of the art, in this case WTSRC, the majority of the time and notice that the improvement gain over baseline, in this case WTSRC, is even greater than in the stationary case. Regarding the drop in reward when 100% of the context is revealed, this is the case where both methods reduce to CTS. Without any adaptions, CTS does not handle nonstationary data any differently than stationary data, which can sometimes result in non-optimal performance. FIG. 1: Stationary Covertype, 10% context known We conclude our experiments by performing a deeper analysis of the Covertype dataset, examining the case where S=U. When S=1, the known context is used to select all U additional context features at once, whereas when S=U, the known context is updated and used to select each of the U additional context features one at a time. Maintaining $v=1$ and $\lambda(t)=1$, for the stationary case, we denote these two cases of the CATSO algorithm as CATSO-1 and CATSO-U respectively and report their performance when 10% of the context is randomly fixed, across various U in FIG. 6. CATSO-1 consistently outperforms CATSO-U across all U tested. CATSO-U likely suffers because incremental feature selection adds nonstationarity to the known context—CATSO-1 is learning relationships between the known and unknown features while CATSO-U is learning relationships between them as the known context grows. Nonetheless, both methods outperform TSRC. For the nonstationary case we use the GP-UCB algorithm for $\lambda(t)$, refer to the S=1 and S=U cases as NCATSO-1 and NCATSOU, and illustrate their performance in FIG. 7. Here we observe that NCATSO-1 and NCATSO-U have comparable performance, and the improvement gain over baseline, in this case WTSRC, is even greater than in the stationary case.

NON-LIMITING EXAMPLES OF APPLICATIONS

This patent described CABO, a new variant of context attentive bandits which focused on contextual bandit problems where the context is not fully observable. We show that FIG. 2: Nonstationary Covertype, 10% context known by knowing part of the context the agent can make a better decision on selecting the next set of features to be revealed. The motivation of this comes from problem scenarios where part of the context features are easier and cheaper to become available while the rest might require time and/or incur cost.

In our experiments, we used a random fixed context to be available beforehand for each dataset. However, it is important to note that in actual applications of this problem setting, the known context feature space is likely nonrandom. It is instead the information most readily at hand, available at little to no cost, and likely highly informative. In our motivating examples of clinical settings, known contexts of patient information are likely highly informative of which medical tests need to be performed and in the case of AI agent orchestration, known context of queries and users are likely highly predictive of which potential agent responses need to be revealed in dialog orchestration. As our immediate next step in the future we hope to evaluate our algorithm on datasets where such a natural partition between the known and unknown context features exists, and expect our method to have an even greater edge in these scenarios. Another direction for future work could be exploring nonstationary in the known context space where the set of known context changes throughout time.

Non-Limiting Definitions

Before beginning the discussion of the various aspects of the illustrative embodiments, it should first be appreciated that throughout this description the term "mechanism" will be used to refer to elements of the present invention that perform various operations, functions, and the like. A ""mechanism"," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general-purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Data Processing Environment

Thus, the illustrative embodiments may be utilized in many different types of data processing environments. In order to provide a context for the description of the specific elements and functionality of the illustrative embodiments, FIG. 1 and FIG. 2 are provided hereafter as example environments in which aspects of the illustrative embodiments may be implemented. It should be appreciated that FIG. 1 and FIG. 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer-usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIG. 1 and FIG. 2 may vary depending on the implementation. Other internal hardware or peripheral devices, such as flash memory, equivalent non-volatile memory, or optical disk drives and the like, may be used in addition to or in place of the hardware depicted in FIG. 1 and FIG. 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Identification And Clustering System

Figure 3:
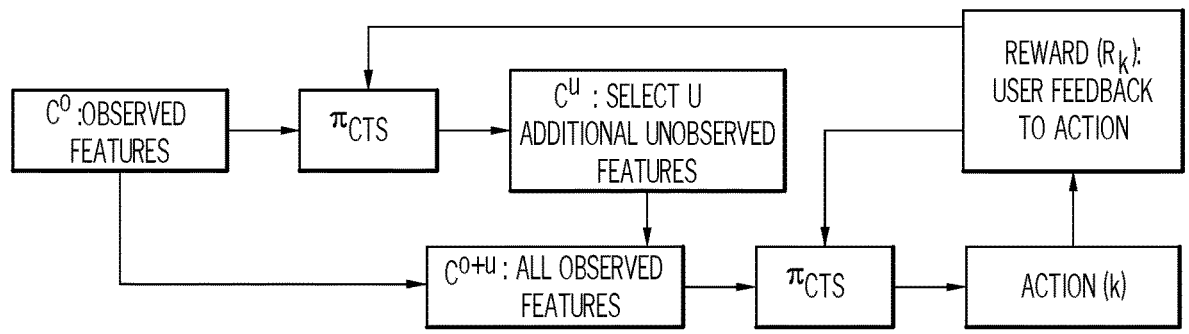
FIG. 3 depicts an example functional block diagram of the present invention's Context-Attentive Thompson Sampling with Observations (CATSO)

In order to identify a top subset (k) of a set of high-quality plans based on the quality of each plan in a set of plans and, amongst the identified top-k plans, identify one or more clusters (m) from the set of top-k plans, the illustrative embodiment provides a plan identification and clustering mechanism that identifies a set of k distinct plans with a lowest cost, ranks the identified top-k plans based on an associated quality, and then groups the top-k plans using clustering techniques forming a set of top-m clusters. FIG. 3 depicts a functional block diagram of such a plan identification with unreliable observations using AI planning. The functional block diagram of FIG. 3 may be implemented, for example, by one or more of the computing devices illustrated in FIG. 1 and/or data processing system 200 of FIG. 2. In the initialization of plan identification and clustering mechanism 300, plan identification and clustering mechanism 300 receives a planning problem.

Software and Hardware Implementation Examples

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the ""C"" programming language or similar programming languages. The computer readable program instructions may execute entirely on the 'user's computer, partly on the 'user's computer, as a stand-alone software package, partly on the 'user's computer and partly on a remote computer or entirely on the remote computer or server. In the latter scenario, the remote computer may be connected to the 'user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for identifying a set of top-k plans based on the quality of each plan in a set of plans and, amongst the identified set of top-k plans, identifying one or more clusters, i.e. top-m clusters, from the set of top-k plans. In particular, the illustrative embodiments identify a set of k distinct plans with a lowest cost, where the k distinction plan includes both optimal plans and near-optimal plans, depending on k, and, by definition, for each plan in this set all valid plans of lower cost must also be in the set. The top-k plans are then ranked based on each plans associated quality, i.e. the cost associated with the plan, where the lowest cost identifies the highest quality. The top-k plans are then grouped using clustering techniques into top-m clusters, with a representative set of each cluster being presented with an option of viewing all plans within that cluster.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters. Disk drives, DVDs, CDs and memory sticks are just a few of the computer readable storage devices.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    a) receiving, by a reinforcement learning agent that is a machine learning system of a computer, initially observable feature values corresponding to a list of initially observable features, a list of initially unobservable features, and a maximum number of features that are observable per iteration of a first cycle, whereby the reinforcement learning agent comprises a reinforcement learning policy that governs selection performed by the reinforcement learning agent, and whereby the reinforcement learning policy comprises a first reinforcement learning policy for feature selection and a second reinforcement learning policy for action selection;
    b) using, by the reinforcement learning agent implementing the first reinforcement learning policy, the initially observable feature values and the maximum number of features that are observable per the iteration of the first cycle to select a group of some of the initially unobservable features to explore, wherein the first reinforcement learning policy comprises a contextual combinatorial bandit algorithm and the using comprises applying the received initially observable feature values and the maximum number to the contextual combinatorial bandit algorithm and the contextual combinatorial bandit algorithm, in response, selects the group of some of the initially unobservable features to explore;
    c) receiving, by the reinforcement learning agent, values for the selected group of the initially unobservable features;
    d) using, by the reinforcement learning agent implementing the second reinforcement learning policy, the received initially observable features along with the received values for the selected group of the initially unobservable features to select a next action from a set of actions, wherein the second reinforcement learning policy comprises a contextual bandit algorithm and the using comprises applying to the contextual bandit algorithm the received initially observable feature values and the received values of the selected group of the initially unobservable features and the contextual bandit algorithm, in response, selects the next action from the set of actions;
    e) receiving, via the reinforcement learning agent, feedback regarding performance of the selected next action;
    f) updating, by the reinforcement learning agent and based on the received feedback, one or more parameters of the contextual combinatorial bandit algorithm of the first reinforcement learning policy for feature selection and one or more parameters of the contextual bandit algorithm of the second reinforcement learning policy for decision selection; and
    g) repeating step b through step f over a settable number of iterations, whereby the first cycle comprises step b) through step f).

2. The method of claim 1, further comprising performing an additional step as part of the first cycle, the additional step comprising:
    updating at least one of the first reinforcement learning policy and the second reinforcement learning policy using a decay parameter computed by a GP-UCB algorithm.

3. The method of claim 1, wherein the initially observable feature values are selected from a group consisting of numeric feature values, structural feature values, string values, and graph values.

4. The method of claim 1, wherein the initially observable features are one or more of patient history and the values of the selected group of the initially unobservable features are received from one or more patient tests.

5. The method of claim 1, wherein the initially observable features are one or more of speech dialog utterances and user history and the values of the selected group of the initially unobservable features are received from one or more responses by a user.

6. The method of claim 1, wherein the initially observable features comprise user information history and the values of the selected group of the initially unobservable features are received from one or more responses of a user.

7. A computer program product comprising a non-transitory computer readable storage medium having a computer readable program stored therein, wherein the computer readable program, when executed via a computer, causes the computer to perform:

a) receiving, by a reinforcement learning agent that is a machine learning system of the computer, initially observable feature values corresponding to a list of initially observable features, a list of initially unobservable features, and a maximum number of features that are observable per iteration of a first cycle, whereby the reinforcement learning agent comprises a reinforcement learning policy that governs selection performed by the reinforcement learning agent, and whereby the reinforcement learning policy comprises a first reinforcement learning policy for feature selection and a second reinforcement learning policy for action selection;

b) using, by the reinforcement learning agent implementing the first reinforcement policy, the initially observable feature values and the maximum number of features that are observable per the iteration of the first cycle to select a group of some of the initially unobservable features to explore, wherein the first reinforcement learning policy comprises a contextual combinatorial bandit algorithm and the using comprises applying the received initially observable feature values and the maximum number to the contextual combinatorial bandit algorithm and the contextual combinatorial bandit algorithm, in response, selects the group of some of the initially unobservable features to explore;

c) receiving, by the reinforcement learning agent, values for the selected group of the initially unobservable features;

d) using, by the reinforcement learning agent implementing the second reinforcement policy, the received initially observable features along with the received values for the selected group of the initially unobservable features to select a next action from a set of actions, wherein the second reinforcement learning policy comprises a contextual bandit algorithm and the using comprises applying to the contextual bandit algorithm the received initially observable feature values and the received values of the selected group of the initially unobservable features and the contextual bandit algorithm, in response, selects the next action from the set of actions;

e) receiving, via the reinforcement learning agent, feedback regarding performance of the selected next action;

f) updating, via the reinforcement learning agent and based on the received feedback, one or more parameters of the contextual combinatorial bandit algorithm of the first reinforcement learning policy for feature selection and one or more parameters of the contextual bandit algorithm of the second reinforcement learning policy for decision selection; and g) repeating step b) through step f) over a settable number of iterations, wherein the first cycle comprises step b) through step f).

8. An apparatus comprising:
a processor; and
a memory coupled to the processor, wherein the memory stores a machine learning system and instructions, the machine learning system comprising a reinforcement learning agent, and wherein the stored instructions, when executed by the processor, cause the processor to perform:

a) receiving, by the reinforcement learning agent, initially observable feature values corresponding to a list of initially observable features, a list of initially unobservable features, and a maximum number of features that are observable per iteration of a first cycle, whereby the reinforcement learning agent comprises a reinforcement learning policy that governs selection performed by the reinforcement learning agent, and whereby the reinforcement learning policy comprises a first reinforcement learning policy for feature selection and a second reinforcement learning policy for action selection;

b) using, by the reinforcement learning agent implementing the first reinforcement policy, the initially observable feature values and the maximum number of features that are observable per the iteration of the first cycle to select a group of some of the initially unobservable features to explore, wherein the first reinforcement learning policy comprises a contextual combinatorial bandit algorithm and the using comprises applying the received values of the initially observable features and the maximum number to the contextual combinatorial bandit algorithm and the contextual combinatorial bandit algorithm, in response, selects the group of some of the initially unobservable features to explore;

c) receiving, by the reinforcement learning agent, values for the selected group of the initially unobservable features;

d) using, by the reinforcement learning agent implementing the second reinforcement policy, the received values of the initially observable features along with the received values of the selected group of the initially unobservable features to select a next action from a set of next actions, wherein the second reinforcement learning policy comprises a contextual bandit algorithm and the using comprises applying to the contextual bandit algorithm the received values of the initially observable features and received values of the selected group of the initially unobservable features and the contextual bandit algorithm, in response, selects the next action from the set of actions;

e) receiving, via the reinforcement learning agent, feedback regarding performance of the selected next action;

f) updating, via the reinforcement learning agent and based on the received feedback, one or more parameters of the contextual combinatorial bandit algorithm of the first reinforcement learning policy for feature selection and one or more parameters of the contextual bandit algorithm of the second reinforcement learning policy for decision selection; and g) repeating step b) through step f) over a settable number of iterations, whereby the first cycle comprises step b) through step f).

9. The method of claim 1, further comprising inputting a new set of initially observable feature values into the updated reinforcement learning agent and, in response, receiving as output from the reinforcement learning agent a recommendation to obtain a respective value for another group of one or more additional features of the list of initially unobservable features.

10. The method of claim 9, further comprising inputting the values for the other group of the one or more additional features into the reinforcement learning agent and, in response, receiving as output from the reinforcement learning agent a recommendation to take a new action.

11. The computer program product of claim 7, wherein the computer readable program, when executed on the computer, causes the computer to further perform: inputting a new set of initially observable feature values into the updated reinforcement learning agent and, in response, receiving as output from the reinforcement learning agent a recommendation to obtain a respective value for another group of one or more additional features of the list of initially unobservable features.

12. The method of claim 1, wherein the contextual bandit algorithm of the second reinforcement learning policy is solved by Thompson sampling as part of selecting the next action from the set of actions.

13. The method of claim 1, wherein the contextual combinatorial bandit algorithm of the first reinforcement learning policy selects the group of some of the initially unobservable features at once.

14. The method of claim 1, wherein the contextual combinatorial bandit algorithm of the first reinforcement learning policy selects the group of some of the initially unobservable features one feature at a time.

15. The method of claim 1, wherein the contextual combinatorial bandit algorithm selects the group of some of the initially unobservable features by implementing a Stochastic model in which an expectation observed for a respective possible group to select is determined using a linear function that is based on a context and a weight vector, the weight vector being learned from the received values and/or the feedback.

16. The method of claim 1, wherein the contextual combinatorial bandit algorithm of the first reinforcement learning policy selects the group using a reward function with nonlinear rewards.

17. The method of claim 1, wherein the contextual combinatorial bandit algorithm of the first reinforcement learning policy performs the selecting of the group of some of the initially unobservable features based on a first reward function trained on previous decisions to select features to maximize a first reward.

18. The method of claim 17, wherein the contextual bandit algorithm of the second reinforcement learning policy performs the selecting of the next action by maximizing a second reward that follows a parametric likelihood function.

19. The method of claim 1, wherein the contextual bandit algorithm of the second reinforcement learning policy performs the selecting of the next action by maximizing a reward that follows a parametric likelihood function.

20. The method of claim 1, wherein the contextual combinatorial bandit algorithm of the first reinforcement learning policy chooses between independent subsets of the initially unobservable features such that the contextual combinatorial bandit algorithm of the first reinforcement learning policy acts as a contextual bandit algorithm.

* * * * *